(12) United States Patent
Han et al.

(10) Patent No.: US 10,783,404 B2
(45) Date of Patent: Sep. 22, 2020

(54) METHOD AND DEVICE FOR VERIFYING RECOGNITION RESULT IN CHARACTER RECOGNITION

(71) Applicant: Tencent Technology (Shenzhen) Company Limited, Shenzhen (CN)

(72) Inventors: Sheng Han, Shenzhen (CN); Hongfa Wang, Shenzhen (CN); Longsha Zhou, Shenzhen (CN); Hui Song, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 135 days.

(21) Appl. No.: 16/208,215

(22) Filed: Dec. 3, 2018

(65) Prior Publication Data
US 2019/0114512 A1  Apr. 18, 2019

Related U.S. Application Data

(63) Continuation-in-part of application No. PCT/CN2017/095992, filed on Aug. 4, 2017.

(30) Foreign Application Priority Data

Aug. 5, 2016  (CN) .......................... 2016 1 0641373

(51) Int. Cl.
*G06K 9/62* (2006.01)
*G06K 9/72* (2006.01)

(52) U.S. Cl.
CPC ......... *G06K 9/6262* (2013.01); *G06K 9/6201* (2013.01); *G06K 9/6227* (2013.01);
(Continued)

(58) Field of Classification Search
USPC ....................................................... 382/159
See application file for complete search history.

(56) References Cited

U.S. PATENT DOCUMENTS

2016/0125275 A1  5/2016  Hamada et al.

FOREIGN PATENT DOCUMENTS

| CN | 101354704 A | 1/2009 |
|---|---|---|
| CN | 102024139 A | 4/2011 |

(Continued)

OTHER PUBLICATIONS

Tencent Technology, ISRWO, PCT/CN2017/095992, Nov. 3, 2017, 6 pgs.
Tencent Technology, IPRP, PCT/CN2017/095992, Feb. 5, 2019, pgs.

*Primary Examiner* — Stephen P Coleman
(74) *Attorney, Agent, or Firm* — Morgan, Lewis & Bockius LLP

(57) ABSTRACT

A method and a device for verifying a recognition result in character recognition are provided. The device constructs a hidden Markov chain for a character string to be recognized, using recognition result output of a character recognition process. The recognition result includes candidate characters of each character in the character string. The device solves for an optimal path forming a candidate character string according to the hidden Markov chain and a pre-trained state transition matrix. The device recognizes non-Chinese characters in the character string according to state transition probabilities in the optimal path. The device verifies the recognition result according to the non-Chinese characters. The device feeds back a verification result to the character recognition process, wherein the character recognition process applied to the character string to be recognized is modified by the verification result.

20 Claims, 5 Drawing Sheets

(52) U.S. Cl.
CPC ......... *G06K 9/6256* (2013.01); *G06K 9/6297* (2013.01); *G06K 9/723* (2013.01); *G06K 2209/01* (2013.01); *G06K 2209/011* (2013.01)

(56) References Cited

FOREIGN PATENT DOCUMENTS

| | | |
|---|---|---|
| CN | 102982330 A | 3/2013 |
| CN | 104598937 A | 5/2015 |
| CN | 104951779 A | 9/2015 |
| CN | 105023029 A | 11/2015 |
| WO | WO 2014075174 A1 | 5/2014 |

METHOD AND DEVICE FOR VERIFYING RECOGNITION RESULT IN CHARACTER RECOGNITION

PRIORITY CLAIMS AND RELATED APPLICATIONS

This application is a continuation-in-part application of PCT application number: PCT/CN2017/095992, entitled "METHOD AND DEVICE FOR VERIFYING RECOGNITION RESULT IN CHARACTER RECOGNITION", filed on Aug. 4, 2017, which claims priority to Chinese Patent Application No. 201610641373.6 entitled "METHOD AND DEVICE FOR VERIFYING RECOGNITION RESULT IN CHARACTER RECOGNITION", filed with the State Intellectual Property Office of the People's Republic of China on Aug. 5, 2016, all of which are incorporated by reference in their entirety.

FIELD OF THE TECHNOLOGY

This application relates to a technical field of character recognition, and more particularly, to a method and a device for verifying a recognition result in optical character recognition.

BACKGROUND OF THE DISCLOSURE

With development of computer technologies, various bills, newspaper, books, manuscripts, and other printed pages have been transformed into image information from paper writing through an optical input mode such as scanning. After image information is obtained, the image information needs to be transformed into computer text that can be used through character recognition. Conventional optical character recognition technology has poor performance due to various reasons.

SUMMARY

One of the main drawbacks of the prior art solutions is that the post-check algorithm is too simple and cannot fully utilize the massive text resources of the Internet to perform an effective verification of the OCR recognition results. The prior art solution relies too much on the recognition effect of a single character, it is impossible to effectively distinguish between a Chinese character segment and a non-Chinese character segment for effective segmentation of the image. The prior art solution to the non-character character segment determination method is too rigid, easy to cause a lot of low-level errors. Due to the above defects of the verification link in the OCR process, the prior art solution cannot form an effective feedback mechanism for the system, so the system cannot automatically determine the recognition effect of the whole and each character segment, and thus cannot flexibly adjust the algorithm to improve the recognition effect.

This application provides a method and a device for verifying a recognition result in character recognition.

The presently disclosed technical solution addresses the deficiencies of the above-mentioned prior art solutions. The technical solution makes uses of the corpus of internet mass text information in training to verify the recognition result, and simultaneously determines the character recognition effect of each character segment, feed it back to the system, and instructs the system to adjust different parts of the recognition algorithm accordingly to improve the recognition result. The method of the present technical solution effectively segments Chinese and non-Chinese character segments in text to flexibly adapt to language models of different languages and improve overall recognition and correction accuracy.

The technical solution provided herein adds a module to the traditional OCR technology processing pipeline and provide a feedback loop to the pipeline to incorporate corrections based on a language model (Sub) system. Through the introduction of the language model, the self-correcting capability of the entire OCR system is improved. As disclosed herein, the system can verify the OCR recognition result, implement a feedback, and guide the system to self-adjust the algorithm.

In one aspect, a method for verifying a recognition result in optical character recognition is performed at a device having one or more processors and memory. The device constructs a hidden Markov chain for a character string to be recognized, using recognition result output of a character recognition process. The recognition result comprises candidate characters of each character to be recognized in the character string to be recognized, and each character to be recognized being corresponding to at least one candidate character. The device solves for an optimal path forming a candidate character string according to the hidden Markov chain and a pre-trained state transition matrix. The candidate character string comprises one of the candidate characters respectively corresponding to each character to be recognized in the character string to be recognized. The device recognizes non-Chinese characters in the character string to be recognized according to state transition probabilities in the optimal path. The device verifies the recognition result according to the non-Chinese characters in the character string to be recognized. The device feeds back a verification result to the character recognition process, wherein the character recognition process applied to the character string to be recognized is modified by the verification result.

According to a second aspect of the present disclosure, a computing system includes one or more processors, memory, a display, a touch-sensitive surface, and a plurality of instructions stored in the memory that, when executed by the one or more processors, cause the computing device to perform the aforementioned method.

According to a third aspect of the present disclosure, a non-transitory computer readable storage medium storing a plurality of instructions configured for execution by a computing system having one or more processors, the plurality of instructions causing the computing device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

BRIEF DESCRIPTION OF THE DRAWINGS

The accompanying drawings are incorporated into the specification to be a part thereof, show the examples of the present disclosure, and interpret the principle of the present disclosure with the specification.

DESCRIPTION OF EMBODIMENTS

The exemplary examples will be described in detail herein, and the examples are shown in the accompanying drawings. When the following description mentions the accompanying drawings, unless otherwise specified, the same number in different accompanying drawings represents the same or similar element. The embodiments described in the following exemplary examples do not represent all embodiments consistent with the present disclosure. On the contrary, these embodiments are only examples of the device and method that are consistent with some aspects of the present disclosure described in the claims in detail.

Figure 1:
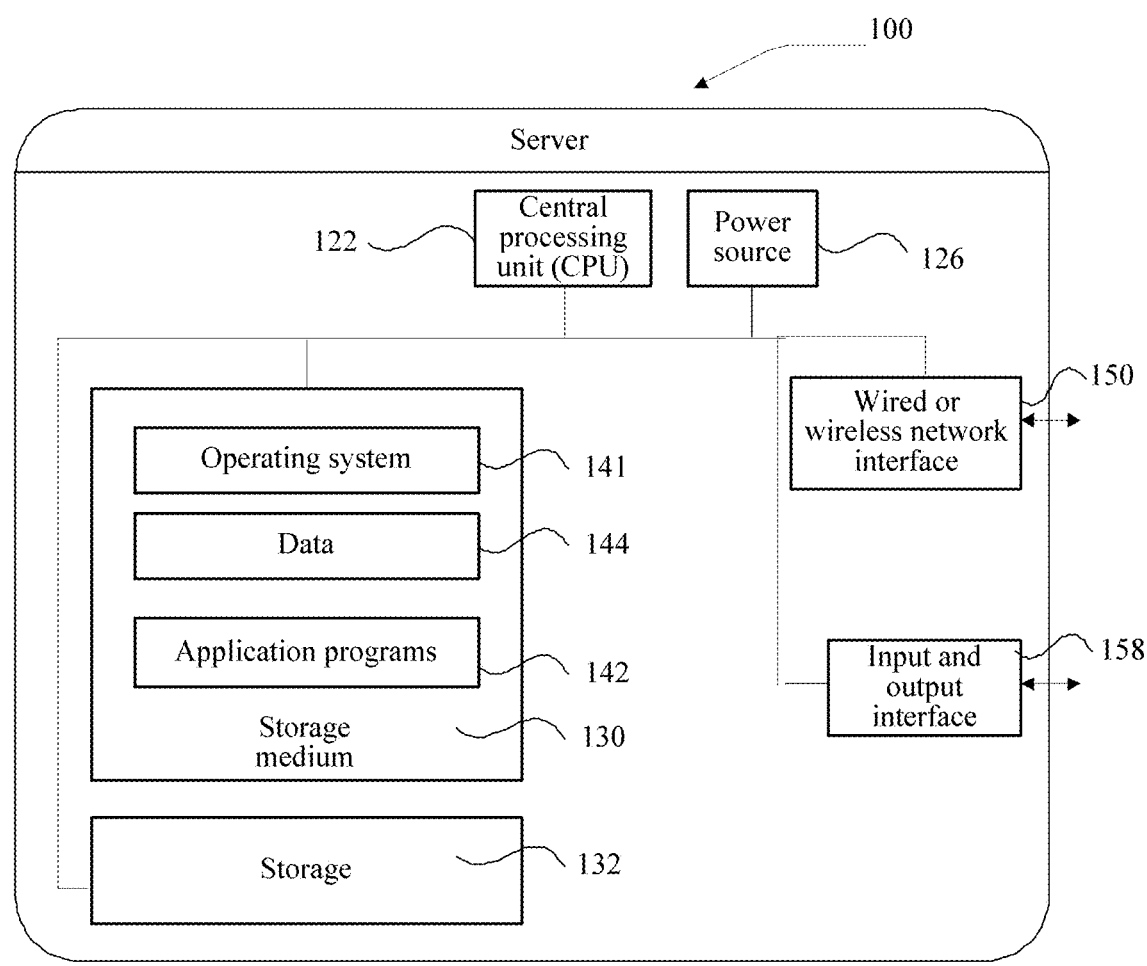
FIG. 1 is a block diagram of a device according to one exemplary example.

FIG. 1 is a block diagram of a device 100 according to one exemplary example. For example, the device 100 is used to provide an implementation environment required by this application. Therefore, the device 100 may be a server.

Figure 4:
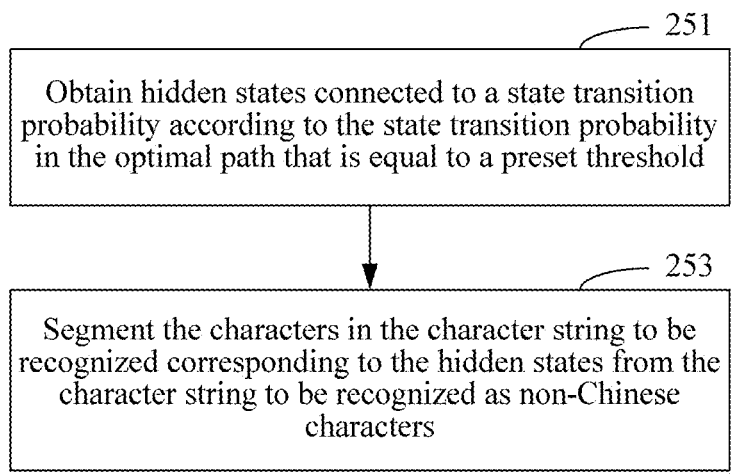
FIG. 4 is flowchart of the steps of recognizing non-Chinese characters in a character string to be recognized according to a state transition probability of an optimal path in a corresponding example in FIG. 2.

Referring to FIG. 1, the server 100 may be significantly different due to different configurations or performance, and may include one or more central processing units (CPU) 122 (for example, one or more processors) and a storage 132, and one or more storage media 130 (for example, mass storage devices) storing application programs 142 or data 144. The storages 132 and the storage media 130 may be for temporary storage or persistent storage. A program stored in a storage medium 130 may include one or more modules (not shown). Each module may include a series of instruction operations on the server. Furthermore, the CPU 122 can be configured to communicate with the storage media 130, and perform a series of instruction operations in the storage media 130 on the server 100. The server 100 can further include one or more power sources 126, one or more wired or wireless network interfaces 150, one or more input and output interfaces 158, and/or one or more operating systems 141, for example, Windows Server™, Mac OS X™, Unix™, Linux™, and Free BSD™. The steps performed by the server described in the examples in FIG. 2, FIG. 3, and FIG. 4 are based on the server structure in FIG. 1.

Figures 2, 3:
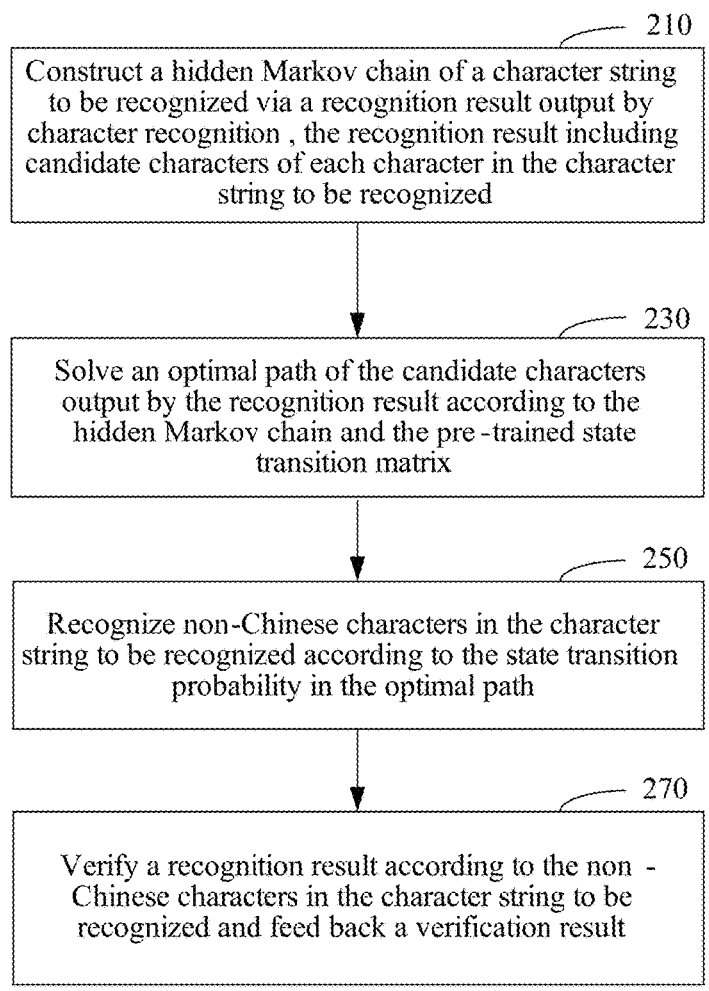
FIG. 2 is a flowchart of a method for verifying a recognition result in character recognition according to an exemplary example.
FIG. 3 is a diagram of an example of a character string to be recognized.

FIG. 2 is a flowchart of a method for verifying a recognition result in character recognition according to an exemplary example. The method for verifying a recognition result in character recognition is used for a device 100 in FIG. 1. As shown in FIG. 2, the method for verifying a recognition result in character recognition can be performed by a server and can include the following steps.

Step 210: Construct a hidden Markov chain of a character string to be recognized via a recognition result output by character recognition (or called as a character recognition process), the recognition result including candidate characters of each of characters in the character string to be recognized.

It can be understood that, the hidden Markov chain is only one of predicted state statistics models, and other types of predicted state statistics models can be constructed via a recognition result output by character recognition (or called as a character recognition process). Therefore, step S201 can also be described as "construct a predicted state statistics model of a character string to be recognized via a recognition result output by a character recognition process, the recognition result including candidate characters of each of characters to be recognized in the character string to be recognized, and each of the characters to be recognized corresponding to at least one candidate character".

The hidden Markov chain can be understood as a hidden Markov model that is a statistics model for describing a Markov process containing a hidden and unknown parameter. In a simple Markov model (for example, Markov chain), a state is a directly visible observer. Therefore, a state transition probability is a unique parameter. In a hidden Markov model, a state is not directly visible, but an output depends on the state and is visible. Each state has a possible probability distribution through a possible output mark. Therefore, a mark sequence is generated through a hidden Markov model to provide information of some sequences about the state. It should be noted that "hidden" refers to that the model transmits a state sequence, instead of parameters of the model. Even if these parameters are precise and known, the model is still called as a "hidden" Markov model.

It should be noted that, there are one or more than two recognition results output by character recognition performed a character string to be recognized. In specific implementation, the number of recognition results output by character recognition is mostly larger than two, and each recognition result includes candidate characters corresponding to each of characters (that is, characters to be recognized) in a character string to be recognized, and the candidate characters are a score of corresponding characters in a character string to be recognized. The higher the score is, the higher the possibility that the candidate characters are consistent with corresponding characters in the character string to be recognized is.

Therefore, regarding an independent character in a character string to be recognized, due to existence of one or more than two recognition results, the independent character has one or more than two candidate characters. In other words, one or more recognition results of candidate characters are output for the independent character, and a hidden Markov chain of candidate characters needs to be output for a character string to be recognition through the recognition result.

A hidden Markov chain for outputting candidate characters for a character string to be recognized mark recognition results of the candidate characters respectively output for the character string to be recognized, and marking of the recognition results is consistent with the sequence of the characters in the character string to be recognized. That is to say, the hidden Markov chain marks a path of outputting candidate characters for the character string to be recognized, that is, the recognition results from which the candidate characters corresponding to the characters in the character string to be recognized are.

Step 230: Solve an optimal path of the candidate characters output by the recognition result according to the hidden Markov chain and the pre-trained state transition matrix, that is, an optimal path of a candidate character string.

One candidate character is selected from all candidate characters of each character to be identified, the candidate characters selected for each character to be recognized in the character string to be recognized form a candidate character string in sequence, the candidate character string is called as a path, different characters selected from the candidate characters may form different paths, and the optimal path refers to a path closest to the character string to be recognized. In step 230, the process "solving an optimal path of the candidate characters output by the recognition result according to the hidden Markov chain and the pre-trained state transition matrix" can be understood as "solving an optimal path forming a candidate character string corresponding to the character string to be recognized according to the hidden Markov chain and the pre-trained state transition matrix".

For example, referring to FIG. 3, in a character string "北京大学深圳医 院临检组检验 报告单" to be recognized, the character "北" to be recognized has candidate characters "北", "比" and "非", the character "京" to be recognized has candidate characters "京", "宗", and "家", the character "大" to be recognized has candidate characters "大", "太", and "犬". One path is "北宗大 孝深洲医阮临楂" 妞检险恨吉单, one path is "比宗大孝深洲医院 临楂妞检险恨吉单", and many other paths are also formed. The optimal path is certainly "北京大学深圳医院 临检组检验报告单".

A state transition matrix is obtained through pre-training, and is used to characterize a conversion probability between two characters. In other words, the possibility that one character and another character form a whole, that is, are connected together, may be learned according to the state transition matrix.

As stated above, a path for outputting candidate characters can be obtained through a hidden Markov chain. Herein, a pre-trained state transition matrix needs to be used to solve an optimal path, so that an optimal path of candidate characters output by a recognition result can be obtained.

Being similar to the hidden Markov chain, an optimal path marks a recognition result outputting the candidate characters, and a state transition probability between recognition results.

Because of solving of an optimal path, not only an independent character is taken into consideration for candidate characters output respectively and correspondingly for the characters in a character string to be recognized, but also candidate characters corresponding to a character string to be recognized are selected as a whole, so as to enhance the entirety of character recognition and further improve final accuracy of character recognition.

In an exemplary example, solving of an optimal path can be realized through a viterbi algorithm.

The recognition effect may be judged as a whole through a pre-trained state transition matrix. One or more recognition results may be obtained through character recognition, each recognition result includes corresponding candidate characters output for the characters in the character string to be recognized, and the candidate characters have a certain score.

The candidate characters output for the characters in the character string to be recognized are connected to construct a recognition result of the character string to be recognized.

The state transition matrix is obtained by pre-training based on Internet text, a state transition probability between two candidate characters can be obtained through the state transition matrix, that is, a possibility that the two candidate characters are connected.

Therefore, the state transition probability between candidate characters in a recognition result is obtained through a pre-trained state transition matrix, thereby considering, as a whole, which candidate characters in several obtained recognition results construct a final recognition result, that is, obtaining an optimal path.

Step 250: Recognize non-Chinese characters in the character string to be recognized according to the state transition probability in the optimal path.

It could be understood that, in a character string to be recognized, characters are connected through a certain sequence to form a character string to be recognized. Correspondingly, candidate characters output for the character string to be recognized are also in such a sequence, every two candidate characters are connected, and furthermore, recognition results of candidate characters output in the optimal path are also correlated, and the correlation means a possibility that one recognition result of characters output in an optimal path is converted into another recognition result in a sequence of characters of the character string to be recognized, that is, the state transition probability.

That is to say, in an optimal path, recognition results forming a path are respectively connected as hidden states, so as to respectively output candidate results of the characters in the character string to be recognized.

On the basis of this, non-Chinese characters in the character string to be recognized can be recognized according to the state transition probability in the optimal path, thereby realizing recognition of the non-Chinese characters in the character string to be recognized as a whole, efficiently segmenting Chinese characters and non-Chinese characters through overall recognition, and enhancing accuracy.

Step 270: Verify a recognition result according to the non-Chinese characters in the character string to be recognized and feed back a verification result.

The recognition result is verified and fed back according to the finally recognized non-Chinese characters, so as to help to adjust recognition algorithms of different types of characters in the character string to be recognized flexibly, and enhance the recognition effects and rectification accuracy.

The verification steps are realized to form an efficient feedback mechanism, and can automatically judge overall recognition effects and recognition effects of each character in character recognition, thereby flexibly adjusting an algorithm to enhance recognition effects and avoiding occurrence of low grade errors in character recognition as far as possible.

Step 210 is described in detail in an exemplary example. Step 210 can include the following steps.

The recognition results of the candidate characters output in a sequence of characters in the character string to be recognized are in hidden states, and the hidden states are connected to construct a hidden Markov chain of the character string to be recognized.

Since the candidate characters have a corresponding relationship with the characters in the character string to be recognized, the recognition results for outputting the corresponding candidate characters serve as hidden states according to the sequence of the characters in the character string to be recognized, and the hidden states are connected according to the sequence corresponding to the characters in the character string to be recognized, thereby obtaining a hidden Markov chain.

The hidden Markov chain is constructed not only to mark a path of outputting candidate characters for the character string to be recognized candidate character, but also to be advantageous to find an optimal path, thereby evaluating whether the recognition currently performed on the character string to be recognized is normal, so as to perform feedback.

FIG. 4 describes the details of step 250 according to an exemplary example. As shown in FIG. 4, step 250 may include the following steps.

Step 251: Obtain hidden states connected to a state transition probability according to the state transition probability in the optimal path that is equal to a preset threshold.

As stated above, an optimal path is solved for the hidden Markov chain, so as to obtain an optimal path of candidate results output for the character string to be recognized. Since the optimal path is selected according to the paths marked in the hidden Markov chain, the optimal path is similar to the hidden Markov chain, and also consists of connected hidden states, the connection has a certain probability through the pre-trained state transition matrix, that is, the state transition probability.

That is to say, in the optimal path, the state transition probability is used to evaluate reliability of outputting candidate characters by a recognition result as a hidden state.

The state transition probability refers to a probability of transiting a state of the former character in two adjacent characters to a state of the latter character. For example, in two adjacent characters "大" and "学" in FIG. 3, the character "大" is a Chinese character and the character "学" is also a Chinese character, the state transition probability corresponding to the two adjacent characters is a probability of transiting a Chinese state to another Chinese state. Furthermore, for example, two adjacent characters are "咀" and "K", the character "咀" is a Chinese character and the character "K" is an English character, and the state transition probability corresponding to the two characters is a probability of transiting a Chinese character to an English character. That is to say, one state transition probability is corresponding to two adjacent characters.

In the example of this application, a hidden state is corresponding to a candidate character, and each candidate character is a hidden state of a character to be recognized. Therefore, the aforementioned step "obtain hidden states connected to a state transition probability according to the state transition probability in the optimal path that is equal to a preset threshold" can also be described as "obtain hidden states corresponding to the state transition probability in the optimal path that is equal to a preset threshold".

The preset threshold is used to not only evaluate the state transition probability in the optimal path, but also replace the state transition probability of the non-Chinese character in the pre-trained state transition matrix.

After the state transition matrix is trained by a Chinese language model and experiences smoothing processing, the preset threshold is used to replace a state transition probability corresponding to non-Chinese characters. Therefore, the state transition probability corresponding to the non-Chinese characters in the state transition probability is the preset threshold.

Therefore, in the optimal path, the characters in the character string to be recognized corresponding to the state transition probability that is equal to the preset threshold are non-Chinese characters.

On the basis of this, the state transition probability in the optimal path that is equal to the preset threshold is connected to obtain a hidden state, and the hidden state is a hidden state connected by the connection having the state transition probability that is equal to the preset threshold.

Step 253: Segment the characters in the character string to be recognized corresponding to the hidden states from the character string to be recognized as non-Chinese characters. That is, the characters corresponding to the hidden state obtained in the character string to be recognized step 251 are recognized as non-Chinese characters.

The candidate characters output by the recognition result that serve as hidden states are corresponding to the characters in the character string to be recognized. Therefore, the hidden states are corresponding to the characters in the character string to be recognized. The state transition matrix between the hidden state and the other hidden states connected thereto is the preset threshold. Therefore, the possibility that the characters in the character string to be recognized corresponding to the hidden states are non-Chinese characters is very high, and then, the characters will be segmented from the character string to be recognized.

According to the aforementioned processes, non-Chinese characters in the character string to be recognized, for example, English characters and/or symbolic characters, are recognized accurately and efficiently.

It could be understood that, the character recognition performed for the character string to be recognized is mostly performed by a recognition algorithm, thereby outputting a corresponding recognition result, a single recognition algorithm cannot adapt to various types of characters, and in the specific implementation, the recognition algorithm is mostly for realizing Chinese recognition. Herein, verification of the recognition result efficiently distinguishes Chinese characters and non-Chinese characters, thereby enhancing recognition effects.

In some examples, step 250 can further include the following steps before step 251.

Perform path scoring according to the state transition probability of the optimal path to obtain a path score of the optimal path.

If the path score is equal to the preset threshold, perform step 251.

In some examples, the following steps can further be included.

If the path score is larger than the preset threshold, Chinese characters are separated from the character string to be recognized according to the state transition probability in the optimal path that is larger than the preset threshold, and the remaining characters in the character string to be recognized are non-Chinese characters obtained through segmentation. That is, hidden states corresponding to the state transition probability in the optimal path that is larger than the preset threshold are determined, the characters in the character string to be recognized determined to be corresponding to the hidden states are recognized as Chinese characters, and the remaining characters in the character string to be recognized serve as the non-Chinese characters.

The path score of the optimal path can be either a maximum state transition probability in the optimal path or an average value of the state transition probability in the optimal path.

The character string to be recognized can be evaluated on the basis of obtaining a recognition result through path scoring, so as to judge whether the current character recognition is really suitable for the character string to be recognized, thereby correcting recognition errors of non-Chinese characters, and instructing the system to perform recognition again if necessary.

Overall consideration is realized through this manner, thereby optimizing global recognition effects, and avoiding actual existence of low grade errors.

The method for verifying a recognition result in character recognition shown in an exemplary example can further include the following steps.

Match non-Chinese characters obtained by segmenting the character string to be recognized with a preset English word list, and segmenting according to the obtained match to obtain English characters and symbolic characters in the character string to be recognized.

The Chinese characters and the non-Chinese characters in the character string to be recognized are obtained through the aforementioned process, and for the non-Chinese characters, English characters and/or symbolic characters will be further recognized.

Specifically, an English word list is preset, and the non-Chinese characters obtained by segmenting the character string to be recognized are matched with the preset English word list, characters matching the English word list are English characters, and characters not matching the English word list are non-English characters.

In an exemplary example, the matching between non-Chinese characters and the English word list can be realized through operation of a minimum editing distance or other distance operation, which will not be limited herein.

Figure 5:
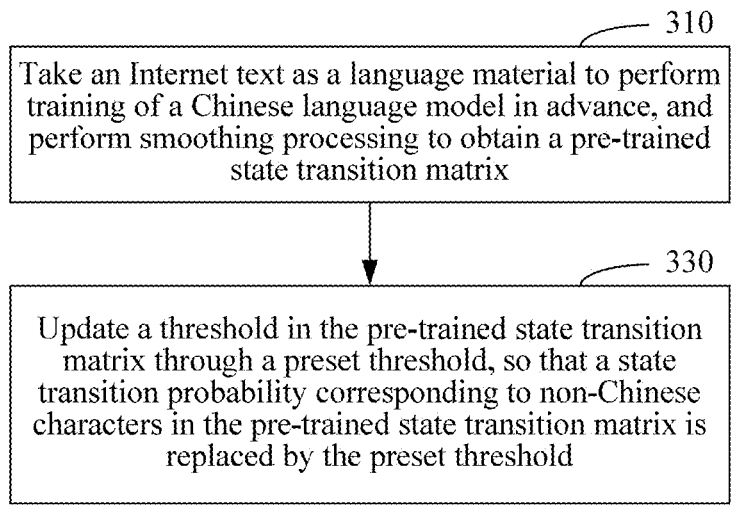
FIG. 5 is a flowchart of a method for verifying a recognition result in character recognition according to another exemplary example.

FIG. 5 shows a method for verifying a recognition result in character recognition according to one exemplary example. As shown in FIG. 5, the method for verifying a recognition result in character recognition includes the following steps.

Step 310: Take an Internet text as a language material to perform training of a Chinese language model in advance, and perform smoothing processing to obtain a pre-trained state transition matrix.

Firstly, mass Internet texts are used as language materials. In an exemplary example, By-gram in the Chinese language model N-gram is used and can also be another N-gram.

Furthermore, the used smoothing processing algorithm can also be a good-turing method, or another smoothing processing module, for example, an add-one model.

Step 330: Update a threshold in the pre-trained state transition matrix through a preset threshold (that is, use the preset threshold to update the state transition probability), so that a state transition probability corresponding to non-Chinese characters in the pre-trained state transition matrix is replaced by the preset threshold.

A non-sparse state transition matrix is obtained through training and smoothing processing of a Chinese language model. In the non-sparse state transition matrix, according to a value corresponding to the state transition probability, existence of a small possibility event can be known, for example, English characters may be probably recognized as Chinese characters due to influence of components in the language material, that is, a small probability event occurs, at this time, the small probability event is replaced by a preset threshold, so as to facilitate following recognition, reduce the storage space occupied by the state transition matrix, and facilitate storage in a memory and following computation.

It should be noted that, the pre-trained state transition matrix can be obtained and the threshold can be updated through off-line training, and then, they can be directly used during character recognition.

With reference to a specific application scene, the method for verifying a recognition result in character recognition is described. For example, FIG. 6 is a schematic view of verifying a recognition result in character recognition in one scene.

Firstly, off-line language model training is performed, that is, the process in step 510. In this process, the text and N-gram language model training and smoothing processing are used to obtain a state transition matrix, and a threshold is set in the state transition matrix, so as to adjust the value in the state transition matrix and provide a pre-trained state transition matrix for the feedback of the character recognition.

Figure 6:
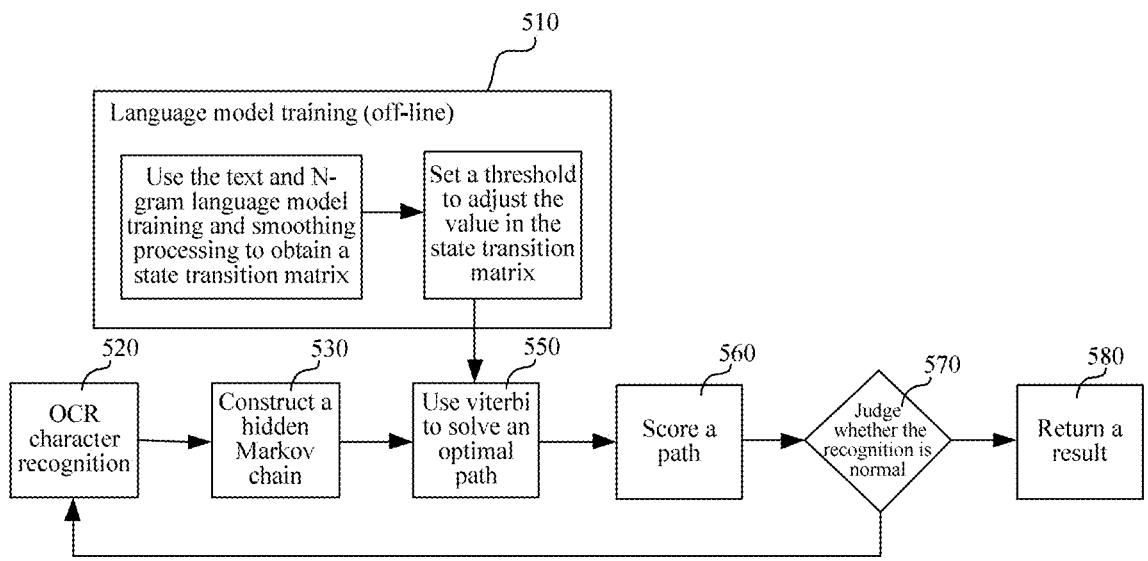
FIG. 6 is a schematic view of verifying a recognition result in character recognition in one scene.

As shown in FIG. 6, after OCR character recognition, that is, step 520, is finished, a corresponding recognition result is output and is based on to construct a hidden Markov chain, so as to form a hidden Markov chain.

In step 550, the state transition matrix and the hidden Markov chain serve as inputs and a Viterbi algorithm is used to solve the optimal path.

The optimal path is scored to obtain a path score, and whether the character string to be recognized is normal is judged according to the path score, for example, whether a non-Chinese character exists is judged, if a non-Chinese character exists, the non-Chinese character is returned, so as to notify the OCR character recognition process that is being performed, that is, step 520 reuses a recognition algorithm suitable to the current character string to be recognized to perform recognition, if it is normal, a result is directly output, as shown in step 580.

The example of the device in this application is described as follows, and can be used to perform the method for verifying a recognition result in character recognition. For the details that are not disclosed in the example of the device in this application, the examples of the method for verifying a recognition result in character recognition may be referred to.

Figure 7:
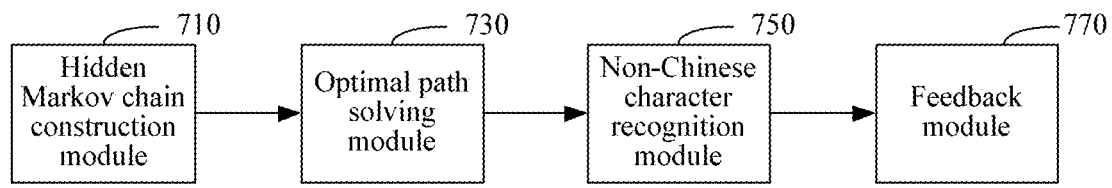
FIG. 7 is a block diagram of a device for verifying a recognition result in character recognition according to one exemplary example.

FIG. 7 is a block diagram of a device for verifying a recognition result in character recognition according to one exemplary example. As shown in FIG. 7, the device for verifying a recognition result in character recognition includes, not limited to:

one or more storages;

one or more processors;

the one or more storages storing one or more instruction modules, configured to be performed by the one or more processors;

the one or more instruction module includes:

a hidden Markov chain construction module 710, an optimal path solving module 730, a non-Chinese character recognition module 750, and a feedback module 770.

The hidden Markov chain construction module 710 is configured to construct a hidden Markov chain of a character string to be recognized according to a recognition result output by character recognition, and the recognition result includes candidate characters of each character of the character string to be recognized. The hidden Markov chain is only one of predicted state statistics models, when another predicted state statistics model is used, the hidden Markov chain construction module 710 can be called a creation module.

In an exemplary example, the hidden Markov chain construction module 710 is further configured to output recognition results of corresponding candidate characters according to a sequence of characters in the character string to be recognized that are hidden states, and the hidden states are connected and constructed to obtain a hidden Markov chain of the character string to be recognized.

The optimal path solving module 730 is configured to solve the optimal path of candidate characters output by a recognition result according to the hidden Markov chain and the pre-trained state transition matrix.

The non-Chinese character recognition module 750 is configured to recognize the non-Chinese character in the character string to be recognized according to the state transition probability in the path.

The feedback module 770 is configured to verify a recognition result according to the non-Chinese character in the character string to be recognized, and feed back a verification result to the character recognition process.

Figure 8:
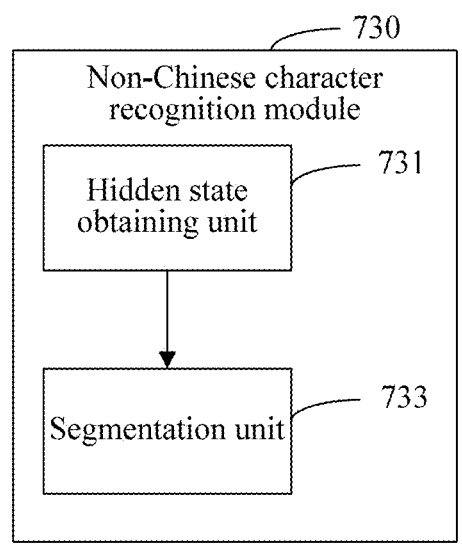
FIG. 8 is a block diagram of a non-Chinese character recognition module in a corresponding example in FIG. 7.

FIG. 8 describes the details of the non-Chinese character recognition module according to an exemplary example. As shown in FIG. 8, the non-Chinese character recognition module 730 includes, not limited to, a hidden state obtaining unit 731 and a segmentation unit 733.

The hidden state obtaining unit 731 is configured to obtain hidden states connected to a state transition probability according to the state transition probability in an optimal path that is equal to a preset threshold.

The segmentation unit 733 is used to segment characters in the character string to be recognized corresponding to the hidden states from the character string to be recognized as non-Chinese characters.

In some examples, the non-Chinese character recognition module 730 further includes a path scoring unit. The path scoring unit is configured to perform path scoring according to the state transition probability in the optimal path, so as to obtain a path score of the optimal path.

If the path score is equal to the preset threshold, the hidden state obtaining unit 731 is informed.

In some examples, the non-Chinese character recognition module 730 further includes a Chinese character segmentation unit.

The Chinese character segmentation unit is configured to segment Chinese characters from the character string to be recognized according to the state transition probability in the optimal path that is larger than the preset threshold if the path score is larger than the preset threshold, and the remaining characters in the character string to be recognized are non-Chinese characters obtained through segmentation.

In some examples, the non-Chinese character recognition module 730 further includes a matching unit. The matching unit is configured to match the non-Chinese characters obtained through segmenting the character string to be recognized with a preset English word list, and segment to obtain English characters and symbolic characters in the character string to be recognized according to an obtained matching result.

Figure 9:
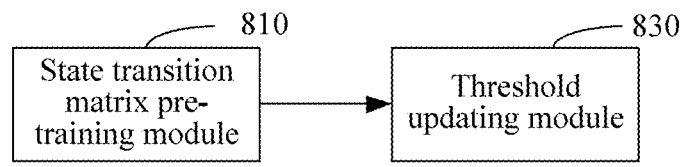
FIG. 9 is a block diagram of a device for verifying a recognition result in character recognition according to another exemplary example.

FIG. 9 shows a device for verifying a recognition result in character recognition according to another exemplary example. As shown in FIG. 9, the device for verifying a recognition result in character recognition further includes, but not limited to, a state transition matrix pre-training module 810 and a threshold updating module 830.

The state transition matrix pre-training module 810 is used to perform training of a Chinese language model in advance by taking an Internet text as a language material, and perform smoothing processing to obtain a pre-trained state transition matrix.

The threshold updating module 830 is configured to perform threshold update in the pre-trained state transition matrix according to the preset threshold, so that the state transition probability corresponding to the non-Chinese characters in the pre-trained state transition matrix is replaced by the preset threshold.

In some examples, this application further provides a device for verifying a recognition result in character recognition, and the device for verifying a recognition result in character recognition performs all or partial steps of the method for verifying a recognition result in character recognition shown in any one of FIG. 2, FIGS. 4, and 4. The device includes:

a processor;
a storage for storing storage executable instructions;
the processor being configured to:
construct a hidden Markov chain of a character string to be recognized through the recognition result output by the character recognition, the recognition result including candidate characters of each character in the character string to be recognized;
solve an optimal path of candidate characters output by the recognition result according to the hidden Markov chain and the pre-trained state transition matrix;
recognize the non-Chinese characters in the character string to be recognized according to the state transition probability in the optimal path;
verify a recognition result according to the non-Chinese characters in the character string to be recognized, and feed back a verification result to the character recognition process.

The specific method for the processor of the device in the example to perform operations has been described in detail in the example of the method for verifying a recognition result in character recognition, and will not be described in detail herein.

Another example of this application further provides a non-volatile computer readable storage medium that stores computer readable instructions capable of making at least one processor perform the method, for example:

construct a hidden Markov chain of a character string to be recognized through a recognition result output by character recognition, the recognition result including candidate characters of each character in the character string to be recognized;
solve an optimal path of the candidate characters output by the recognition result according to the hidden Markov chain and the pre-trained state transition matrix;
recognize non-Chinese characters in the character string to be recognized according to the state transition probability in the optimal path;
verify the recognition result according to the non-Chinese characters in the character string to be recognized, and feed back the verification result to the character recognition process.

A person of ordinary skill in the art may understand that all or some of the steps realizing the foregoing examples may be implemented by hardware or a program instructing relevant hardware. The program may be stored in a computer readable storage medium that may be a read-only memory (ROM), a magnetic disk, an optical disc, or the like.

It should be noted that, the present disclosure is not limited to the precise structures that have been described and shown in the accompanying drawings and can be modified and changed without departing from the scope, and the scope of the present disclosure is only limited by the claims.

What is claimed is:

1. A method for verifying a recognition result in optical character recognition, comprising:

at a device having one or more processors and memory:
constructing a hidden Markov chain for a character string to be recognized, using recognition result output of a character recognition process, the recognition result comprising candidate characters of each character to be recognized in the character string to be recognized, and each character to be recognized being corresponding to at least one candidate character;

solving for an optimal path forming a candidate character string according to the hidden Markov chain and a pre-trained state transition matrix, the candidate character string comprising one of the candidate characters respectively corresponding to each character to be recognized in the character string to be recognized;

recognizing non-Chinese characters in the character string to be recognized according to state transition probabilities in the optimal path;

verifying the recognition result according to the non-Chinese characters in the character string to be recognized; and feeding back a verification result to the character recognition process, wherein the character recognition process applied to the character string to be recognized is modified by the verification result.

2. The method according to claim 1, wherein the step of constructing the hidden Markov chain of the character string to be recognized, using the recognition result output of the character recognition process comprises:

outputting recognition results of the corresponding candidate characters as hidden states according to a sequential ordering of characters in the character string to be recognized, the hidden states being connected to construct the hidden Markov chain of the character string to be recognized.

3. The method according to claim 1, further comprising:

taking Internet text as language material to perform training of a Chinese language model;

performing smoothing processing on the Chinese language model to obtain the pre-trained state transition matrix; and updating state transition probabilities of the pre-trained state transition matrix using a preset threshold, so that the state transition probabilities corresponding to non-Chinese characters in the pre-trained state transition matrix are replaced by the preset threshold.

4. The method according to claim 1, wherein recognizing the non-Chinese characters in the character string to be recognized according to the state transition probabilities of the optimal path comprises:

obtaining hidden states corresponding to a state transition probability in the optimal path that is equal to a preset threshold, the preset threshold being used to replace a state transition probability of a non-Chinese character in the pre-trained state transition matrix; and recognizing characters corresponding to the hidden states obtained in the character string to be recognized as non-Chinese characters.

5. The method according to claim 4, wherein the step of recognizing the non-Chinese characters in the character string to be recognized according to the state transition probabilities of the optimal path further comprises:

matching the non-Chinese characters in the character string to be recognized with a preset English word list; and determining English characters and symbolic characters in the character string to be recognized according to an obtained matching result.

6. The method according to claim 4, wherein recognizing the non-Chinese characters in the character string to be recognized according to the state transition probabilities of the optimal path further comprises:

performing path scoring according to the state transition probabilities in the optimal path, so as to obtain a path score of the optimal path; and performing the step of obtaining the hidden states corresponding to a state transition probability in the optimal path that is equal to the preset threshold in accordance with a determination that the path score is equal to the preset threshold.

7. The method according to claim 6, wherein the step of recognizing the non-Chinese characters in the character string to be recognized according to state transition probabilities of the optimal path further comprises:

determining the hidden states corresponding to state transition probabilities in the optimal path that are larger than the preset threshold, in accordance with a determination that the path score is larger than the preset threshold;

recognizing characters corresponding to the hidden states determined in the character string to be recognized as Chinese characters; and recognizing remaining characters in the character string to be recognized as non-Chinese characters.

8. A computing system, comprising:

one or more processors;

memory; and a plurality of instructions stored in the memory, wherein the instructions, when executed by the one or more processors, cause the one or more processors to perform the following operations:

constructing a hidden Markov chain for a character string to be recognized, using recognition result output of a character recognition process, the recognition result comprising candidate characters of each character to be recognized in the character string to be recognized, and each character to be recognized being corresponding to at least one candidate character;

solving for an optimal path forming a candidate character string according to the hidden Markov chain and a pre-trained state transition matrix, the candidate character string comprising one of the candidate characters respectively corresponding to each character to be recognized in the character string to be recognized;

recognizing non-Chinese characters in the character string to be recognized according to state transition probabilities in the optimal path;

verifying the recognition result according to the non-Chinese characters in the character string to be recognized; and feeding back a verification result to the character recognition process, wherein the character recognition process applied to the character string to be recognized is modified by the verification result.

9. The computing system according to claim 8, wherein the step of constructing the hidden Markov chain of the character string to be recognized, using the recognition result output of the character recognition process comprises:
  outputting recognition results of the corresponding candidate characters as hidden states according to a sequential ordering of characters in the character string to be recognized, the hidden states being connected to construct the hidden Markov chain of the character string to be recognized.

10. The computing system according to claim 8, wherein the operations further include:
  taking Internet text as language material to perform training of a Chinese language model;
  performing smoothing processing on the Chinese language model to obtain the pre-trained state transition matrix; and
  updating state transition probabilities of the pre-trained state transition matrix using a preset threshold, so that the state transition probabilities corresponding to non-Chinese characters in the pre-trained state transition matrix are replaced by the preset threshold.

11. The computing system according to claim 8, wherein recognizing the non-Chinese characters in the character string to be recognized according to the state transition probabilities of the optimal path comprises:
  obtaining hidden states corresponding to a state transition probability in the optimal path that is equal to a preset threshold, the preset threshold being used to replace a state transition probability of a non-Chinese character in the pre-trained state transition matrix; and
  recognizing characters corresponding to the hidden states obtained in the character string to be recognized as non-Chinese characters.

12. The computing system according to claim 11, wherein the step of recognizing the non-Chinese characters in the character string to be recognized according to the state transition probabilities of the optimal path further comprises:
  matching the non-Chinese characters in the character string to be recognized with a preset English word list; and
  determining English characters and symbolic characters in the character string to be recognized according to an obtained matching result.

13. The computing system according to claim 11, wherein recognizing the non-Chinese characters in the character string to be recognized according to the state transition probabilities of the optimal path further comprises:
  performing path scoring according to the state transition probabilities in the optimal path, so as to obtain a path score of the optimal path; and
  performing the step of obtaining the hidden states corresponding to a state transition probability in the optimal path that is equal to the preset threshold in accordance with a determination that the path score is equal to the preset threshold.

14. The computing system according to claim 13, wherein the step of recognizing the non-Chinese characters in the character string to be recognized according to state transition probabilities of the optimal path further comprises:
  determining the hidden states corresponding to state transition probabilities in the optimal path that are larger than the preset threshold, in accordance with a determination that the path score is larger than the preset threshold;
  recognizing characters corresponding to the hidden states determined in the character string to be recognized as Chinese characters; and
  recognizing remaining characters in the character string to be recognized as non-Chinese characters.

15. A non-transitory computer-readable storage medium storing a plurality of instructions configured for execution by a computing system having one or more processors, wherein the plurality of instructions cause the computing system to perform the following operations:
  constructing a hidden Markov chain for a character string to be recognized, using recognition result output of a character recognition process, the recognition result comprising candidate characters of each character to be recognized in the character string to be recognized, and each character to be recognized being corresponding to at least one candidate character;
  solving for an optimal path forming a candidate character string according to the hidden Markov chain and a pre-trained state transition matrix, the candidate character string comprising one of the candidate characters respectively corresponding to each character to be recognized in the character string to be recognized;
  recognizing non-Chinese characters in the character string to be recognized according to state transition probabilities in the optimal path;
  verifying the recognition result according to the non-Chinese characters in the character string to be recognized; and
  feeding back a verification result to the character recognition process, wherein the character recognition process applied to the character string to be recognized is modified by the verification result.

16. The non-transitory computer-readable storage medium according to claim 15, wherein the step of constructing the hidden Markov chain of the character string to be recognized, using the recognition result output of the character recognition process comprises:
  outputting recognition results of the corresponding candidate characters as hidden states according to a sequential ordering of characters in the character string to be recognized, the hidden states being connected to construct the hidden Markov chain of the character string to be recognized.

17. The non-transitory computer-readable storage medium according to claim 15, wherein recognizing the non-Chinese characters in the character string to be recognized according to the state transition probabilities of the optimal path comprises:
  obtaining hidden states corresponding to a state transition probability in the optimal path that is equal to a preset threshold, the preset threshold being used to replace a state transition probability of a non-Chinese character in the pre-trained state transition matrix; and
  recognizing characters corresponding to the hidden states obtained in the character string to be recognized as non-Chinese characters.

18. The non-transitory computer-readable storage medium according to claim 17, wherein the step of recognizing the non-Chinese characters in the character string to be recognized according to the state transition probabilities of the optimal path further comprises:
  matching the non-Chinese characters in the character string to be recognized with a preset English word list; and
  determining English characters and symbolic characters in the character string to be recognized according to an obtained matching result.

19. The non-transitory computer-readable storage medium according to claim 17, wherein recognizing the non-Chinese characters in the character string to be recognized according to the state transition probabilities of the optimal path further comprises:
   performing path scoring according to the state transition probabilities in the optimal path, so as to obtain a path score of the optimal path; and
   performing the step of obtaining the hidden states corresponding to a state transition probability in the optimal path that is equal to the preset threshold in accordance with a determination that the path score is equal to the preset threshold.

20. The non-transitory computer-readable storage medium according to claim 19, wherein the step of recognizing the non-Chinese characters in the character string to be recognized according to state transition probabilities of the optimal path further comprises:
   determining the hidden states corresponding to state transition probabilities in the optimal path that are larger than the preset threshold, in accordance with a determination that the path score is larger than the preset threshold;
   recognizing characters corresponding to the hidden states determined in the character string to be recognized as Chinese characters; and
   recognizing remaining characters in the character string to be recognized as non-Chinese characters.

* * * * *